United States Patent
Nakanishi et al.

(10) Patent No.: US 8,331,736 B2
(45) Date of Patent: Dec. 11, 2012

(54) IMAGE PROCESSING DEVICE AND METHOD THEREFOR

(75) Inventors: Keiko Nakanishi, Tokyo (JP); Makoto Enomoto, Kawasaki (JP); Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 12/469,379

(22) Filed: May 20, 2009

(65) Prior Publication Data
US 2009/0304304 A1   Dec. 10, 2009

(30) Foreign Application Priority Data
Jun. 4, 2008   (JP) .................................. 2008-147202

(51) Int. Cl.
*G06K 9/60* (2006.01)

(52) U.S. Cl. ..... 382/305; 345/468; 345/667; 348/207.2; 358/1.11; 358/1.13; 358/1.16; 358/1.18; 358/403; 358/448; 358/462; 358/475; 358/488; 358/508; 382/101; 382/161; 382/174; 382/176; 382/177; 382/229; 382/232; 382/284; 382/289; 382/290; 386/230; 399/82; 399/83; 707/711; 707/758; 707/769; 715/205; 715/239; 715/246; 715/733; 717/175

(58) Field of Classification Search ............................ None
See application file for complete search history.

(56) References Cited

U.S. PATENT DOCUMENTS

| | | | | |
|---|---|---|---|---|
| 5,282,065 A * | 1/1994 | Rackman | ...................... | 358/488 |
| 5,311,607 A * | 5/1994 | Crosby | ...................... | 382/290 |
| 5,377,021 A * | 12/1994 | Mori | ...................... | 358/462 |
| 5,506,918 A * | 4/1996 | Ishitani | ...................... | 382/289 |
| 5,594,809 A * | 1/1997 | Kopec et al. | ...................... | 382/161 |
| 5,689,585 A * | 11/1997 | Bloomberg et al. | ...................... | 382/229 |
| 5,805,783 A * | 9/1998 | Ellson et al. | ...................... | 345/468 |
| 5,848,325 A * | 12/1998 | Matsumura | ...................... | 399/83 |
| 6,323,961 B1 * | 11/2001 | Rackman | ...................... | 358/448 |
| 6,404,921 B1 | 6/2002 | Ishida | ...................... | 382/197 |
| 6,407,828 B1 * | 6/2002 | Medina | ...................... | 358/462 |
| 6,765,687 B2 * | 7/2004 | Tanaka et al. | ...................... | 358/1.18 |
| 7,042,599 B2 * | 5/2006 | Yokota et al. | ...................... | 358/475 |
| 7,152,205 B2 * | 12/2006 | Day et al. | ...................... | 715/239 |
| 7,305,129 B2 * | 12/2007 | Chellapilla et al. | ...................... | 382/174 |
| 7,355,764 B2 * | 4/2008 | Ooshima et al. | ...................... | 358/488 |
| 7,423,776 B2 * | 9/2008 | Murata | ...................... | 358/1.16 |
| 7,614,051 B2 * | 11/2009 | Glaum et al. | ...................... | 717/175 |
| 7,801,907 B2 * | 9/2010 | Fischer et al. | ...................... | 707/758 |

(Continued)

FOREIGN PATENT DOCUMENTS

JP   06-124338   5/1994

(Continued)

*Primary Examiner* — Tsung-Yin Tsai
(74) *Attorney, Agent, or Firm* — Fitzpatrick, Cella, Harper & Scinto

(57) ABSTRACT

An image processing device is provided which generates an easily reusable electronic document from an input image in which different page sizes are mixed.

The image processing device generates a plurality of pieces of display information from a plurality of document images, and, depending on the size and the direction of each of the images, converts the pieces of display information into electronic documents. That is, the plurality of pieces of display information are divided into a plurality of groups, depending on the size and the direction of each of the images, and the display information included in each of the groups is converted into a separate electronic document. Further, sequence information based on the input order of the plurality of document images is stored on an electronic document.

13 Claims, 16 Drawing Sheets

U.S. PATENT DOCUMENTS

| | | | |
|---|---|---|---|
| 7,930,292 B2* | 4/2011 | Nakajima | 707/711 |
| 2002/0018072 A1* | 2/2002 | Chui | 345/667 |
| 2002/0054387 A1* | 5/2002 | Yokota et al. | 358/509 |
| 2002/0060694 A1* | 5/2002 | Matsui et al. | 345/733 |
| 2002/0081122 A1* | 6/2002 | Ohwa | 399/82 |
| 2002/0149800 A1* | 10/2002 | Medina | 358/426.02 |
| 2004/0012814 A1* | 1/2004 | Tanaka et al. | 358/1.18 |
| 2004/0146199 A1* | 7/2004 | Berkner et al. | 382/176 |
| 2004/0163047 A1* | 8/2004 | Nagahara et al. | 715/517 |
| 2004/0190784 A1* | 9/2004 | Ozawa et al. | 382/232 |
| 2005/0018926 A1* | 1/2005 | Momose et al. | 382/284 |
| 2005/0158032 A1* | 7/2005 | Kang et al. | 386/95 |
| 2005/0238244 A1 | 10/2005 | Uzawa | 382/242 |
| 2006/0101058 A1* | 5/2006 | Chidlovskii | 707/102 |
| 2006/0155741 A1* | 7/2006 | Oezgen | 707/102 |
| 2006/0282760 A1* | 12/2006 | Tanaka | 715/509 |
| 2007/0035780 A1* | 2/2007 | Kanno | 358/403 |
| 2007/0058189 A1* | 3/2007 | Yaguchi | 358/1.13 |
| 2007/0192335 A1* | 8/2007 | Sugiura et al. | 707/10 |
| 2008/0031490 A1* | 2/2008 | Kobayashi | 382/101 |
| 2008/0180531 A1* | 7/2008 | Sekiguchi | 348/207.2 |
| 2010/0149569 A1* | 6/2010 | Yoshida | 358/1.11 |
| 2011/0161348 A1* | 6/2011 | Oron | 707/769 |
| 2011/0182513 A1* | 7/2011 | Eshghi et al. | 382/177 |

FOREIGN PATENT DOCUMENTS

| | | |
|---|---|---|
| JP | 07-093511 | 4/1995 |
| JP | 11-120321 | 4/1999 |
| JP | 3026592 | 1/2000 |
| JP | 2005-173922 | 6/2005 |
| JP | 2005-346137 | 12/2005 |
| WO | WO 2009017324 A1 * | 2/2009 |

* cited by examiner

| IMAGE SIZE | CHARACTER DIRECTION | STORAGE DESTINATION |
|---|---|---|
| A4 (210×297) | 90°, 270° | A4 TRANSVERSAL |
| A4 (210×297) | 0°, 180° | A4 LONGITUDINAL |
| A3 (297×420) | 90°, 270° | A3 TRANSVERSAL |
| A3 (297×420) | 0°, 180° | A3 LONGITUDINAL |

FIG.4

```
<Document Name="A4 LONGITUDINAL">
<PageSize w="210mm" y="297mm">
<Page Index="1">
<Layout>
    <Path d="M49 1.51-0.5 110.5 112.5 -2.511
-0.5h511... 1-0.5 0.5z"/>
    <Path d="M64 1h32v48c0 2 0 2 -4.0 2h-
6.0v-5.0h5v-13.0h-22.0v4c0 3.3... 22h22v-
8.0h-22.0z"/>
...
    <Link URI="./A4 TRANSVERSAL#Index=2">TO NEXT PAGE</Link>
</Layout>
</Page>
</Document>
```

FIG.9

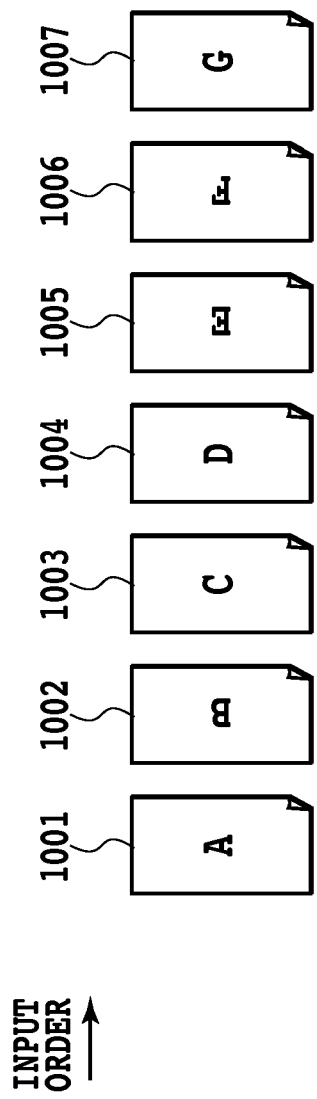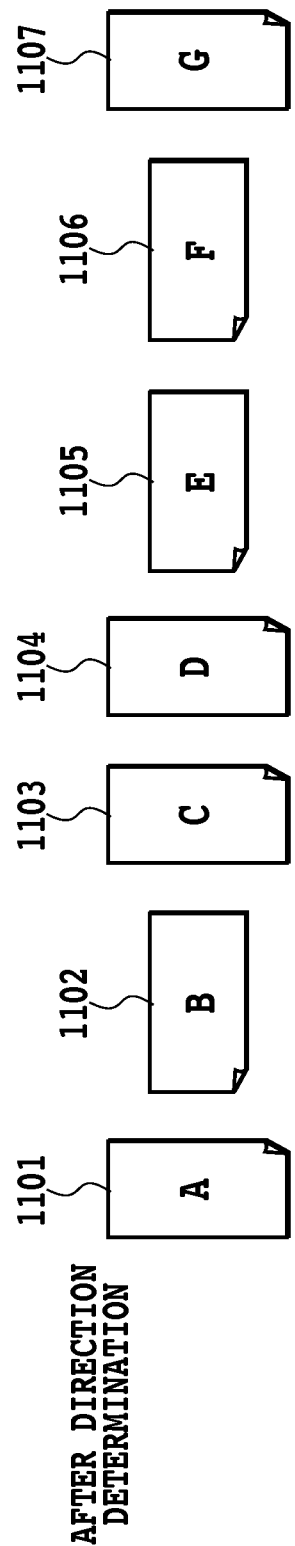

| SEQUENCE | STORAGE DESTINATION |
| --- | --- |
| 1 | A4 LONGITUDINAL 1ST PAGE |
| 2 | A4 TRANSVERSAL 1ST PAGE |
| 3 | A4 LONGITUDINAL 2ND PAGE |
| 4 | A4 LONGITUDINAL 3RD PAGE |
| 5 | A4 TRANSVERSAL 2ND PAGE |
| 6 | A4 TRANSVERSAL 3RD PAGE |
| 7 | A4 LONGITUDINAL 4TH PAGE |

FIG.13

```
<Document Name="A4 LONGITUDINAL">
 <PageSize w="210mm" y="297mm">
 <Page Index="1">
  <Layout>
   <Path d="M49 1.51-0.5 110.5 112.5 -2.511
-0.5h511... 1-0.5 0.5z"/>
   ...
  </Layout>
 </Page>
 <Page Index="2">
  <Layout>
   <Path d="M629 30.510.5 0.512 111 115
2.511 1v ...1-1.0 0.5z"/>
   ...
  </Layout>
 </Page>
...
 <Page Index="4">
  ...
 </Page>

<MultiPage Index>
  <URI="./A4 LONGITUDINAL FILE.x#Index=1">
  <URI="./A4 TRANSVERSAL FILE.x#Index=1">
  <URI="./A4 LONGITUDINAL FILE.x#Index=2">
  <URI="./A4 LONGITUDINAL FILE.x#Index=3">
  <URI="./A4 TRANSVERSAL FILE.x#Index=2">
  <URI="./A4 TRANSVERSAL FILE.x#Index=3">
  <URI="./A4 LONGITUDINAL FILE.x#Index=4">
 </ MultiPageIndex>
</Document>
```

FIG.15

```
<Document Name="A4 TRANSVERSAL">
 <PageSize w="297mm" y="210mm">
 <PageIndex="1">
  <Layout>
   <Path d="M629 30.510.5 0.512 111 115 2.511
1v11-6.0 1h-5.0v11...1-1.0 0.5z"/>
   <Path d="M648.5 31.5h5v11-1.0 1h-1.0v11-
1.0... 7h8v-6.0h-8.0z"/>
   ...
  </Layout>
 </Page>
 <Page Index="2">
  <Layout>
   <Path d="M629 30.510.5 0.512 111 115 2.511
1v ...1-1.0 0.5z"/>
   ...
  </Layout>
 </Page>
 <Page Index="3">
  <Layout>
   <Path d="M629 30.510.5 0.512 111 115 2.511
1v ...1-1.0 0.5z"/>
   ...
  </Layout>
 </Page>
</Document>
```

1602 — Page Index="1" block
1603 — Page Index="2" block
1604 — Page Index="3" block
631, 630

FIG.16

IMAGE PROCESSING DEVICE AND METHOD THEREFOR

BACKGROUND OF THE INVENTION

1. Field of the Invention

The present invention relates to a device and a method for converting a document image into an electronic document.

2. Description of the Related Art

In recent years, due to spreading of network represented by the Internet, many documents are distributed electronically, however, many electronic documents are also distributed in a state being printed on papers. Among the distributed paper documents, there are ones in which different size papers (A4 size, A3 size, or the like) and different manuscript-direction papers (longitudinal manuscript-direction, transversal manuscript-direction, or the like) are mixed. On the other hand, a technology is known which converts such a paper document into an electronic document. Moreover, in Japanese Patent Laid-Open No. 2005-173922, a technology is disclosed which inputs a plurality of document images, divides them into groups (chapters) each composed of continuous pages having the same manuscript-direction, and thereby generates a document of hierarchical structure.

When converting a paper document in which papers each having a different size and papers each having a different manuscript direction are mixed, into a reusable electronic document, it is desirable to carry out conversion so that the electronic document can be reproduced and printed while maintaining each page size (paper size). However, there also exists a format of an electronic document in which document pages each having a different page size cannot be mixed in one electronic document. For example, in an application of Microsoft PowerPoint (trademark), since the direction of slide (page setting) must be determined to be longitudinal or transversal, it is not possible to mix longitudinal pages and transversal pages in one file. When an electronic document has such a format, if a page having a paper size different from that of an electronic document needs to be included in the document, the size of the page have to be changed. If the size is changed, however, there is a case that a display may be difficult to see, a printed image may be small, or a printed image may be larger than the paper. This degrades an editing property and reproducibility during printing of the electronic document, causing a user to suffer from inconvenience of use.

In Japanese Patent Laid-Open No. 2005-173922, although, pages are divided into chapters by continuity of their manuscript-directions, this technology is based on a premise of a format in which documents each having a different page size can be mixed, and there is no description regarding to a format in which documents each having a different page size can not be mixed.

Accordingly, an object of the present invention is to provide a device that, in case of converting paper documents in which different size and manuscript-direction papers are mixed into electronic documents, generates an easily reusable electronic document even if it has a format in which documents each having a different page size can not be mixed.

SUMMARY OF THE INVENTION

An image processing device of the present invention, comprises: an analyzing unit configured to analyze a size and a direction of each of a plurality of input images; a display information generating unit configured to generate display information of each of the images based on the plurality of images; a storage destination determining unit configured to determine an electronic document to be a storage destination of each of the pieces of display information, based on the size and direction of each of the images analyzed by the analyzing unit; a sequence information generating unit configured to generate sequence information of each of the pieces of display information, based on an input order of the plurality of images; and a storing unit configured to store the display information and the sequence information on the electronic document of the storage destination determined by the determining unit.

An image processing method of the present invention, comprising the steps of: an analyzing a size and a direction of each of a plurality of input images; generating an display information for each of the plurality of images based on the images; determining an electronic document to be a storage destination of each of the pieces of display information, based on the size and direction of each of the images analyzed by the analyzing unit; generating sequence information of each of the pieces of the display information based on an input order of the plurality of images; and storing the display information and the sequence information on the electronic document of a storage destination determined by the determining step.

According to the present invention, even for an electronic document having a format in which pages each having a different page size cannot be mixed, it is possible to generate an easily reusable electronic document having an improved editing property, while maintaining the manuscript-direction and the input-order of each of input images.

Further features of the present invention will become apparent from the following description of exemplary embodiments (with reference to the attached drawings).

BRIEF DESCRIPTION OF THE DRAWINGS

FIG. 4 is a view illustrating a storage destination determining rule;

FIG. 9 is a view illustrating another example of an electronic document generated according to an XML format;

FIG. 10 is a view illustrating another example of a document image;

FIG. 11 is a view illustrating a state in which, input images each of which manuscript direction is determined to be 270° are rotated so that their manuscript direction become to be 0°, are arranged in parallel with each other;

FIG. 13 is a view illustrating a sequence information index;

FIG. 15 is a view illustrating an example of an electronic document generated according to an XML format;

FIG. 16 is a view illustrating an example of an electronic document generated according to an XML format.

DESCRIPTION OF THE EMBODIMENTS

Hereinafter, with reference to appended drawings, preferable embodiments of the present invention will be described in detail.

First Embodiment

Figure 1:
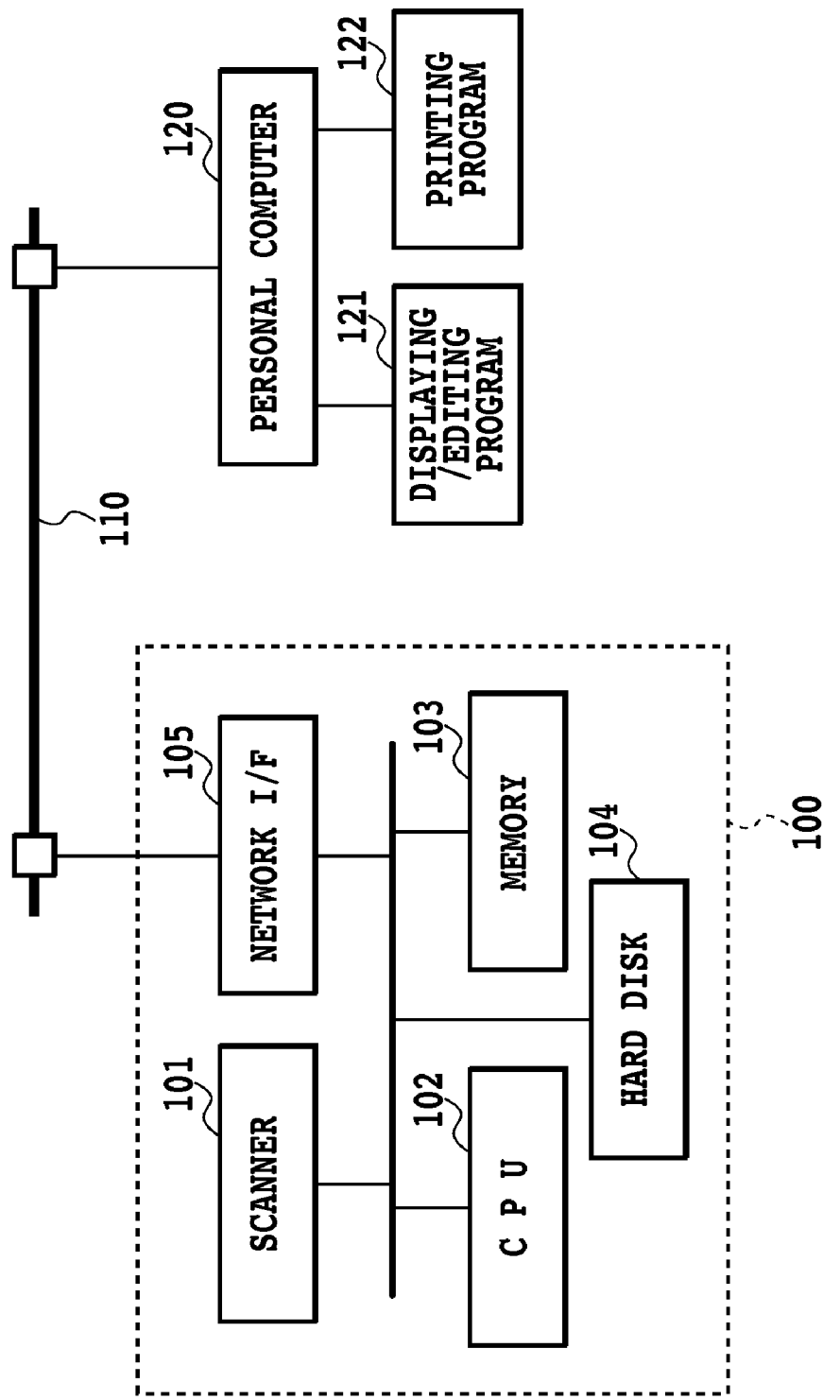
FIG. 1 is a block diagram illustrating an exemplary configuration of a system.

FIG. 1 is a block diagram illustrating an exemplary configuration of a system according to a first embodiment.

This system includes an image processing device 100, a personal computer (PC) 120, and a LAN 110.

The image processing device 100 converts a document image into an electronic document by executing electronic document generating processing according to the first embodiment.

The image processing device 100 includes a scanner 101 that converts paper information of a paper document into a document image, a CPU 102 that totally controls the image processing device 100, a memory 103, a hard disk 104, and a network I/F 105.

The PC 120 receives an electronic document from the image processing device 100 via the LAN 110. The PC 120 executes a built-in displaying/editing program 121. The displaying/editing program 121 displays the electronic document on a display and supports editing work by a user. Moreover, the displaying/editing program 121 prints the electronic document using a printing program 122. In addition, it is supposed that the displaying/editing program 121 is an application treating an electronic document having a format in which different size pages cannot be mixed.

Figure 2:
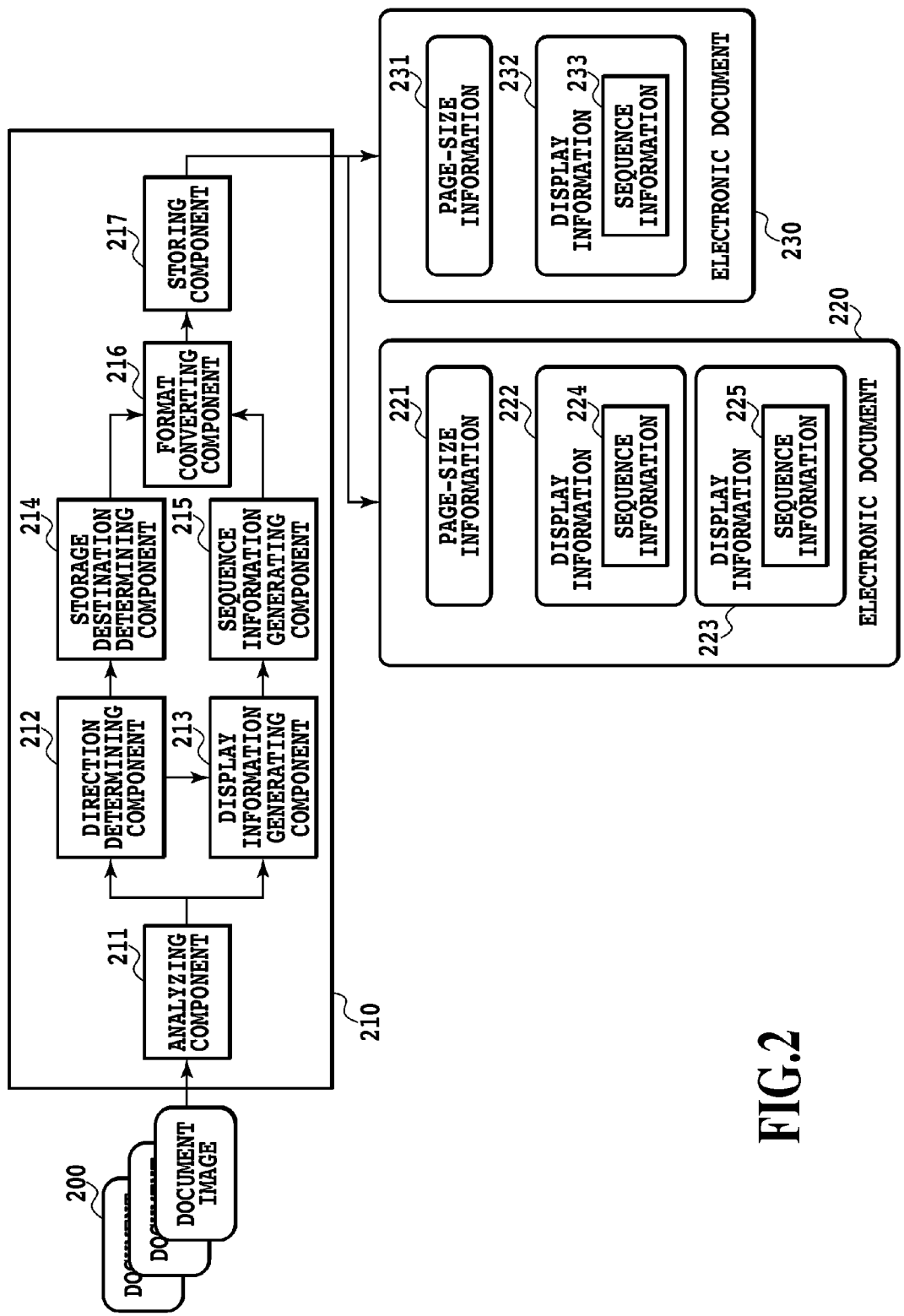
FIG. 2 is a block diagram illustrating an exemplary configuration of an image processing device that executes electronic document generation processing.

FIG. 2 is a block diagram illustrating an exemplary configuration of an image processing device 100 that executes electronic document generation processing according to the first embodiment.

Reference numerals 200 are a plurality of document images sequentially input from the scanner 101 etc.

Reference numeral 210 is an electronic document generating component that converts the plurality of input document images 200 into an electronic document.

Reference numerals 220 and 230 are electronic documents each having the same page size information generated by the same method. That is, each of the electronic documents 220 and 230 has a format in which a plurality of page sizes cannot be mixed.

Hereinafter, an exemplary configuration of the electronic document generating component 210 will be described in detail.

An analyzing component 211 analyzes the plurality of input images 200 so as to extract a dimension (page size) of each of the document images and regions (a text region, a graphic region, a background region, or the like) of the document image.

A direction determining component 212 determines a manuscript direction (among directions of 0°, 90°, 180° and 270°) based on the direction of a character included in the text region extracted by the analyzing component 211. It is possible to determine the manuscript direction using a known technology. For example, a case in which characters included in the text region are recognized in multiple directions so as to determine a direction having highest similarity in recognition results as the direction of each of the characters, and majority processing with respect to the direction of each of the characters is executed so as to determine the manuscript direction (among directions of 0°, 90°, 180° and 270°) of each of document images 200, is included. In addition, in the present embodiment, although an example of a manuscript-direction determining method using character recognition is described, the present invention is not limited to the case.

A display information generating component 213 converts contour information of each of characters included in the text region extracted by the analyzing component 211 into vector drawing data. Next, based on the manuscript-direction of each of the document images 200 received from the direction determining component 212, by correcting the drawing data so that the manuscript-direction erects, the display information generating component 213 generates display information of each manuscript (each page). Note that, it is supposed that a region (such as a photograph region) that cannot be converted into vector data is included in the display information as raster data. Furthermore, although, in the present embodiment, contour information in the text region should be converted into vector data based on the contour of the character, the present invention is not limited to the case. For example, the drawing data (display information) of a text region may be generated by combining a character recognition result and font data.

A storage destination determining component 214, based on a dimension (size) of each of the document images 200 analyzed by the analyzing component 211 and a manuscript-direction of each of the document images 200 determined by the direction determining component 212, determines an electronic document of a storage destination of display information of each page generated by the display information generating component 213. For example, when the component 214 corrects each page of input document images so that the document direction erects, if determined that two kinds of page sizes exist, it will generate two electronic documents 220 and 230. Then, any one of the electronic documents 220 and 230 is determined to be a storage destination of display information of each page, and the document images will be allocated so as to be stored on any one of them. Specifically, the storage destination determining component 214 determines the storage destination so that document images 200 having the same page size information are stored on the same electronic document. In other words, the storage destination determining component 214 determines the storage destination so that document images 200 each having a different page size information are stored on different storage destination.

A sequence information generating component 215, based on the sequential order by which each document image is input, generates sequence information corresponding to the display information. Specifically, it generates a link to the next page (and a link to the previous page) of input order for each page. Thus, a link may be generated between pages of different electronic documents.

A format converting component 216 converts the display information and the sequence information received from the sequence information generating component 215 into a format of the storage destination (the electronic document 220 or 230) determined by the storage destination determining component 214.

A storing component 217 stores the display information and the sequence information of each page, which is subjected to format conversion by the format converting component 216, on the storage destination determined by the storage destination determining component 214.

The electronic document 220 is constructed by one piece of page-size information 221, pages-number (in the example of FIG. 2; two) pieces of display information 222 and 223, and pages-number pieces of sequence information 224 and 225. Similarly, the electronic document 230 is constructed by one piece of page-size information 231, pages-number (in the example of FIG. 2; one) pieces of display information 232, and pages-number pieces of sequence information 233. The electronic documents 220 and 230 are transmitted to the PC 120 via the LAN 110, and displayed and edited there by the displaying/editing program 121 installed on the PC 120.

While, the page-size information 221 indicates a page size specific to the electronic document 220, the page-size information 231 indicates a page size specific to the electronic document 230. The page size is determined based on a longitudinal dimension and a transversal dimension of a document image after it is corrected so that the manuscript direction erects. Note that, the page-size information may be defined using information of manuscript sizes (lengths of its long side and its short side) and longitudinal/transversal (portrait/landscape) information, or it may be defined using information of longitudinal and transversal lengths of the page.

While the pieces of display information 222 and 223 indicate the display information of the electronic document 220, the display information 232 indicates the display information of the electronic document 230. These pieces of display information are used by the displaying/editing program. In these pieces of display information, the display information generated by the display information generating component 213, and the pieces of sequence information 224, 225 and 233 generated by the sequence information generating component 215 are included.

Figure 3:
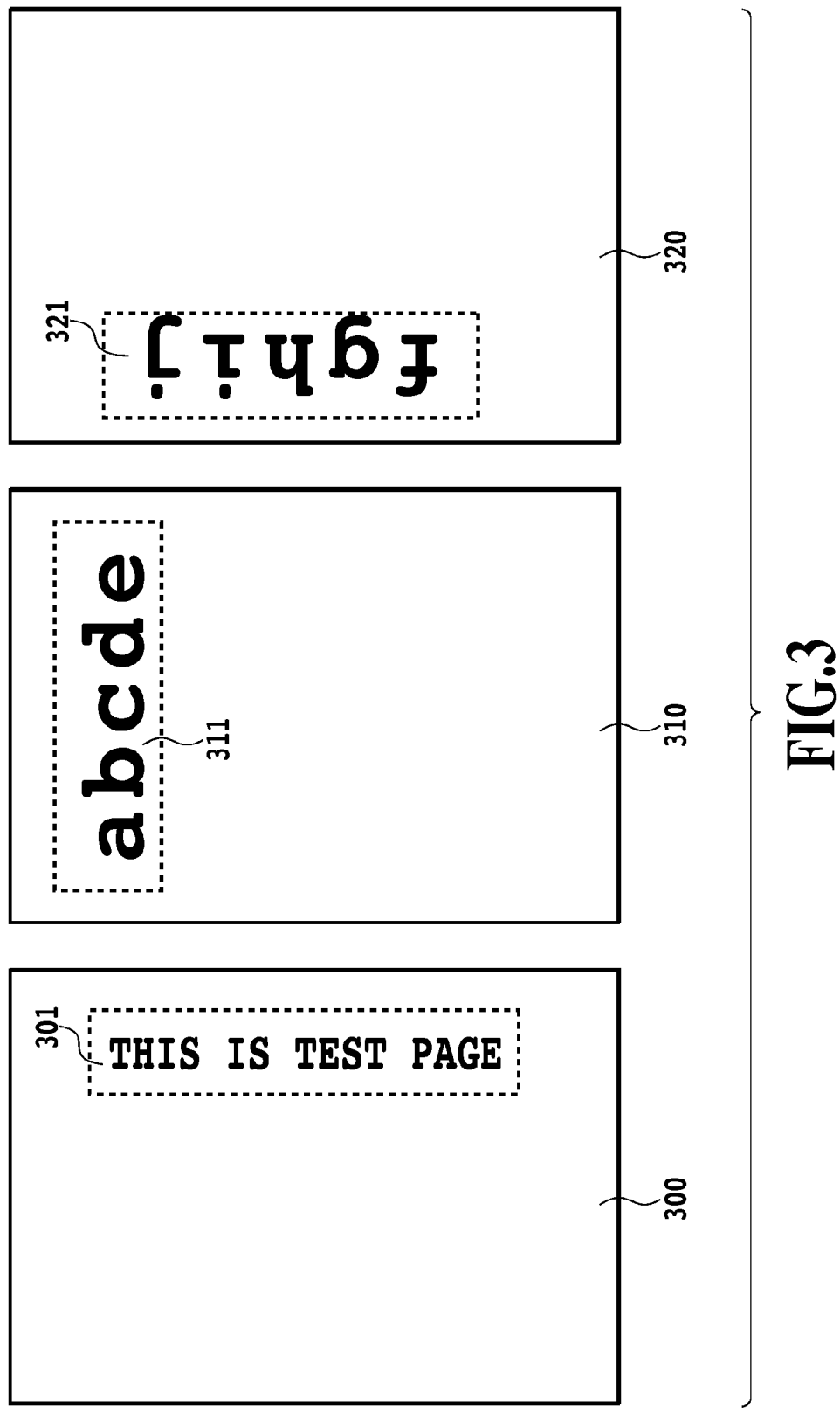
FIG. 3 is a view illustrating an example of a document image.

FIG. 3 is a view illustrating an example of a plurality of document images 200 input into the electronic document generating component 210.

It is supposed that the document image 200 is composed of images 300, 310 and 320. Processing executed by the electronic document generating component 210 with respect to the images 300, 310 and 320, when these images are input into the component 210 in this order, will be described below.

The analyzing component 211 determines a dimension of each of the images 300, 310 and 320 from information of pixel number and resolution of each of them, and extracts a text region in each of the input images, using a known image analysis processing. Here, it is supposed that each of the three images is determined to be an A4 (210 mm×297 mm) image. Further, the analyzing component 211 extracts set of pixels constituting each of the characters from each of the images, and it further extracts regions among the set of pixels, in which set of pixels each having an equivalent dimension are arranged longitudinally or transversally, as a text region. As approaches to extract set of pixels constituting a character, there are approaches, such as, for example, an approach for extracting pixel block having an approximate color from a multiple-valued image as the text region, and an approach for extracting a text region based on a black pixel block obtained by binarizing a multiple-valued image. Moreover, an approach for extracting a text region as pixels in an edge by generating edge information from differentiation of a multiple-valued image, is also included. In the present embodiment, any one of these approaches may be used. In an example illustrated in FIG. 3, the analyzing component 211 extracts regions 301, 311 and 312, which are surrounded by dotted lines in the figure, as text regions.

The direction determining component 212 detects a character direction in each of the text regions using a known character recognizing technology so as to determine the manuscript direction. In the example illustrated in FIG. 3, the manuscript direction of the image 300 is determined to be 90° because the character direction of the text region 301 is 90°. Moreover, the manuscript direction of the image 310 is determined to be 0° because the character direction of the text region 311 is 0°. Further more, the manuscript direction of the image 320 is determined to be 270° because the character direction of the text region 321 is 270°.

The display information generating component 213 converts the image data of each text region into vector drawing data of characters using known vectorizing technology, and generates display information for one page. Examples of vectorizing technologies include methods disclosed in Japanese Patent Publication No. 3026592 and Japanese Patent Application Laid-Open No. 2005-346137. In the technology disclosed in Japanese Patent Publication No. 3026592, first, an image is raster-scanned, and, based on states of a target pixel and the neighboring pixels, inter-pixel vectors in horizontal and vertical directions are detected. Next, based on a connection state of these inter-pixel vectors, the contour of the image data is extracted. By these steps, pieces of information so called outline vectors that describe the circumference of coupled pieces of image data by the set of inter-pixel vectors, are generated. Moreover, in Japanese Patent Laid-Open No. 2005-346137, a technology in which, by approximating outline vectors with straight lines, and 2nd and 3rd Bezier curves, vector description data is generated while keeping high image quality even magnified largely, is disclosed.

The display information generating component 213, using a known technology, performs processing also on regions except for the text region to generate display information. For a region of graphic, the component 213, by converting it into vector data (or raster image data), generates display information of the image. For regions of background and photograph, the component 213, by converting them into raster image data (such as JPEG data), generates display information of the image. Note that, the component 213, by correcting rotatedly the display information of each page so that the manuscript direction of each page erects (becomes to 0°), generates display information.

The storage destination determining component 214, for example, based on a storage destination determining rule illustrated in FIG. 4, determines the storage destination of display information. As mentioned above, the dimension of each image and the character direction in each image are determined by the analyzing component 211 and the direction determining component 212. Thus, the storage destination of the display information of the image 300 is determined to be "A4 transversal" (electronic document 220), the storage destination of the display information of the image 310 is determined to be "A4 longitudinal" (electronic document 230), and the storage destination of the display information of the image 320 is determined to be "A4 transversal" (electronic document 220).

The sequence information generating component 215, based on the input order of the images 300, 310 and 320, generates sequence information. Specifically, the component 215 gives sequence information of list structure type to display information by generating a hyperlink to the next display information (and the previous display information) in the display information.

In the example illustrated in FIG. 3, sequence information 1 is given for the display information of the image 300, sequence information 2 is given for the display information of the image 310, and sequence information 3 is given for the display information of the image 320. As the result, a list structure by a hyperlink as illustrated in FIG. 7 is generated.

Figure 7:
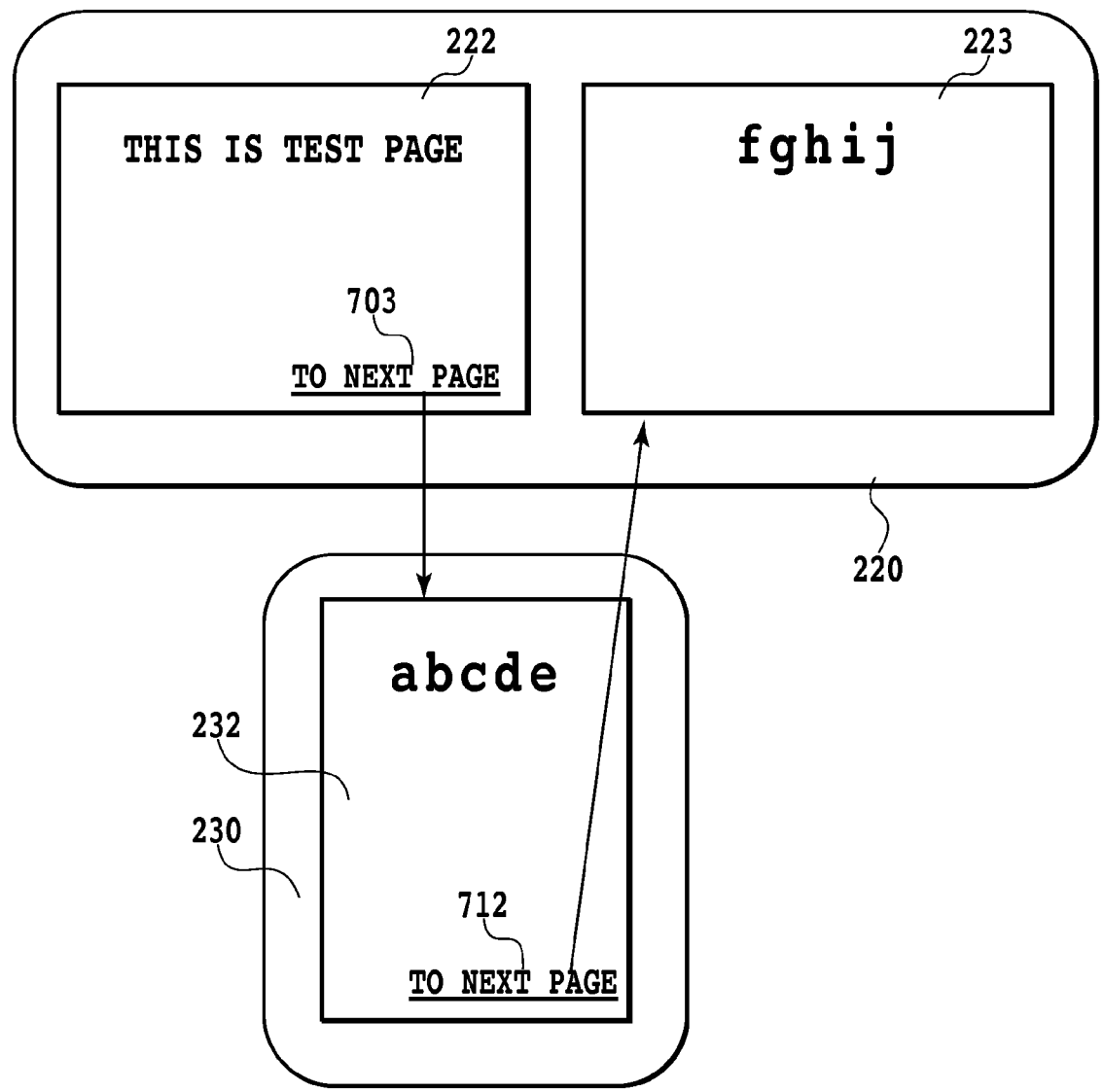
FIG. 7 is a view illustrating an exemplary construction of a list by a hyperlink.

In FIG. 7, information 222 indicates the display information of the image 300, information 223 indicates the display information of the image 320, and information 232 indicates the display information of the image 310.

The storing component 217, based on the result of determination by the storage destination determining component 214, stores the display information 222 and 223 on the electronic document 220. Similarly, the storing component 217, based on the result of determination by the storage destination determining component 214, stores the display information 232 on the electronic document 230. In the display information 222, hyperlink data 703 to the display information 232 is described as sequence information, and in the display information 232, hyperlink data 712 to the display information 223 is described as sequence information. Note that, in the example of FIG. 7, although a configuration in which only hyperlink data to the next page is described, is illustrated, further, a configuration in which hyperlink data to the previous page is described, may be used.

The format converting component 216, according to the storage destination determined by the storage destination determining component 214 and the sequence information generated by the sequence information generating component 215, converts the display information 222, 223 and 232 into an electronic document format, and generates electronic documents 220 and 230.

Figure 8:
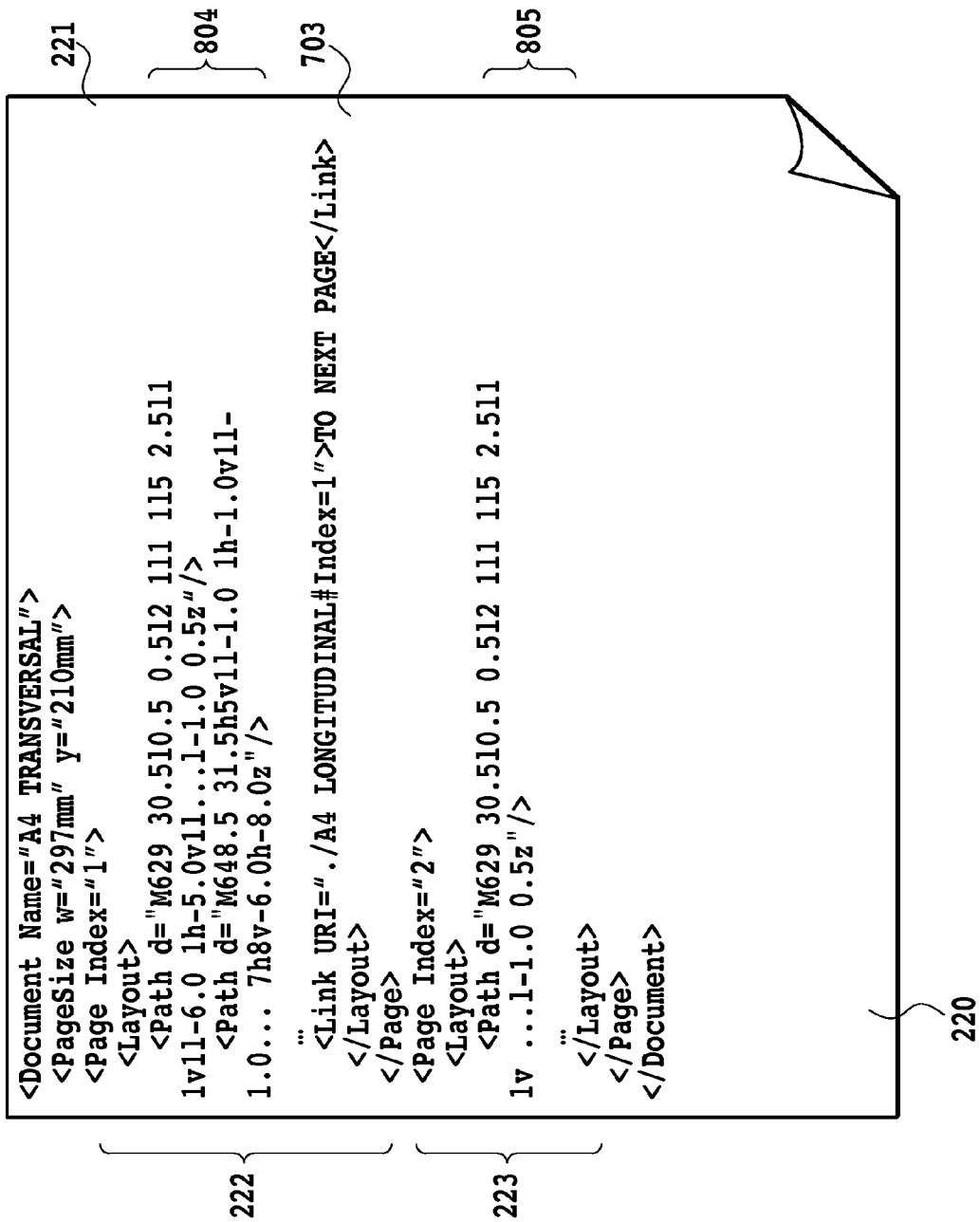
FIG. 8 is a view illustrating an example of an electronic document generated according to an XML format.

FIGS. 8 and 9 are views illustrating examples of the electronic documents 220 and 230 generated according to a virtual XML format for describing the first embodiment, respectively.

In the electronic document 220 illustrated in FIG. 8, the page-size information 221, the display information 222 and 223, and the hyperlink data 703 are described. The display information 222 is configured by vector drawing data 804, and the display information 223 is configured by vector drawing data 805. On the other hand, in the electronic document 230 illustrated in FIG. 9, the page-size information 231, the display information 232, and the hyperlink data 712 are described. The display information 232 is configured by vector drawing data 903.

Next, exemplary processing of an electronic document by the displaying/editing program 121 installed on the PC 120 will be described.

The displaying/editing program 121 processes the electronic documents 220 and 230 generated from the images 300, 310 and 320 by the image processing device 100, on the PC 120.

Figure 5:
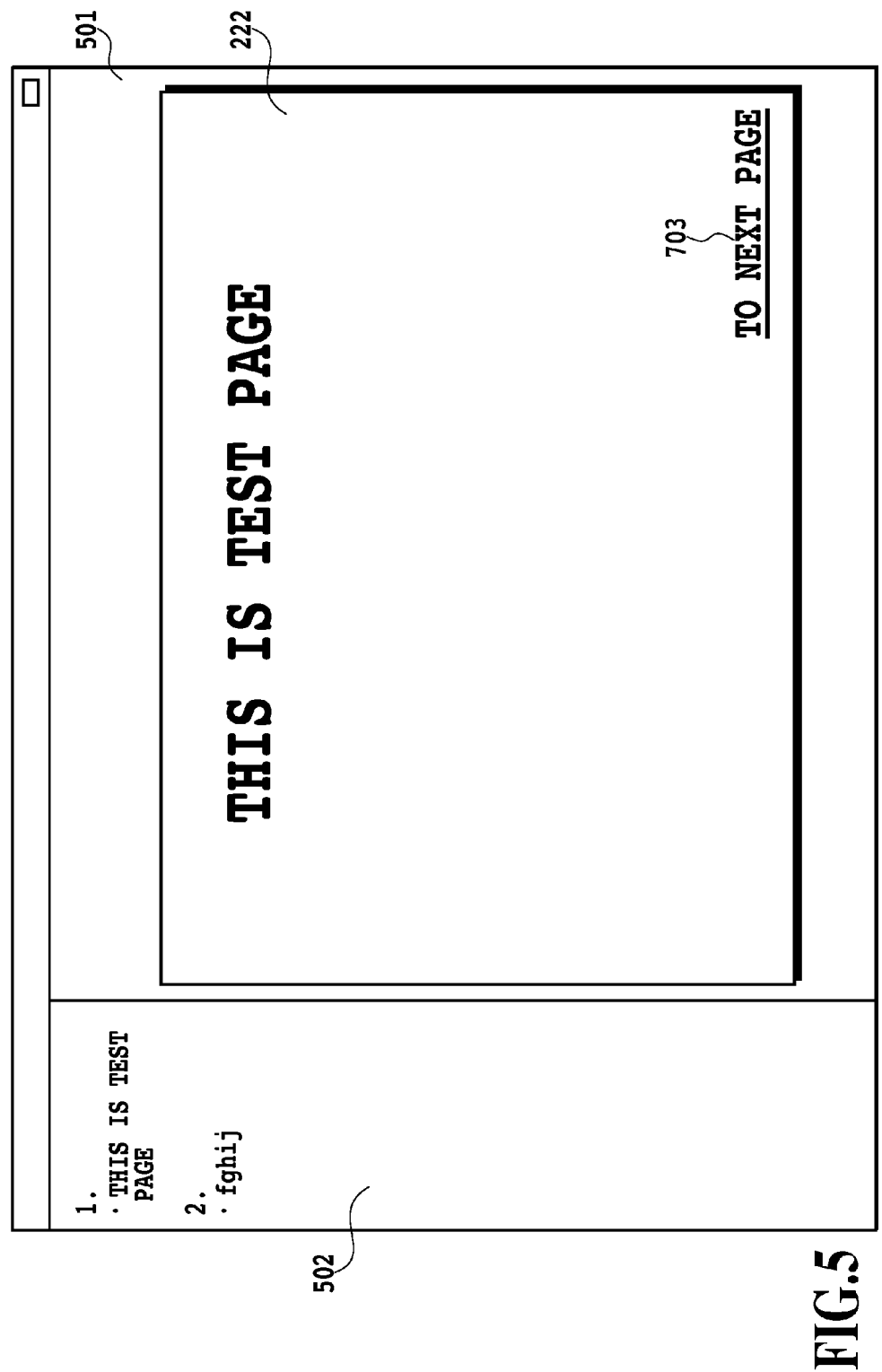
FIG. 5 is a view illustrating an exemplary display of an electronic document by a displaying/editing program.

FIG. 5 is a view illustrating an exemplary display of an electronic document by the displaying/editing program 121.

Reference numeral 501 is a layout editing window, and reference numeral 502 is a page selecting window.

On the layout editing window 501, the display information 222 of the electronic document 220 is displayed. Moreover, on the layout editing window 501, the hyperlink data 703 is also displayed. In the layout editing window 501, a user carries out editing works such as scaling and altering of color information of the display information 222, and further, it stores the edited display information on a storage device or prints the information.

On the page selecting window 502, a list of a plurality of pieces of display information included in the electronic document 220, that is, a list of a plurality of pages, is displayed. A user selects display information from the list and edits the information. When the electronic document 220 is input, two pieces of the display information ("this is a test page" and "fghij") included in the electronic document 220 are displayed on a page selecting window 503. In addition, if the hyperlink 703 is indicated by a user, the first page of the electronic document 230 of the link destination will be displayed.

Figure 17B:
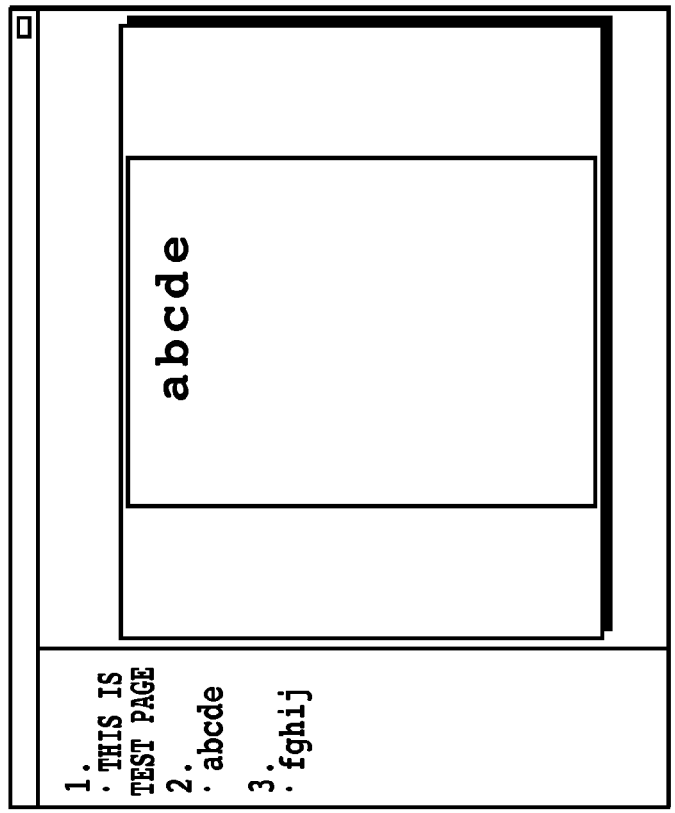
FIGS. 17A and 17B are views illustrating another exemplary display of an electronic document.
Figure 17A:
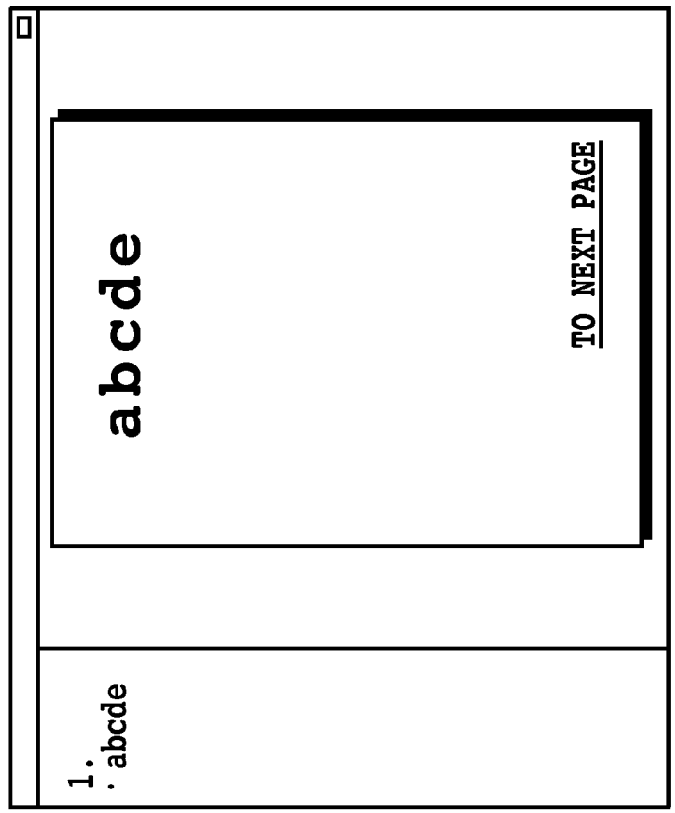

FIG. 17A is a view illustrating an exemplary display when display information ("abcde") 232 of the electronic document 230 is displayed on the layout editing window 502. As is clear from the figure, the display information 232 is directly displayed according to the page size information 231 of the electronic document 230, that is, the page size of the image 310. On the other hand, FIG. 17B is a view illustrating an exemplary display when the display information 232 of the electronic document 230 is displayed so that the page size 310 matches the page size of the images 300 and 320 without using the present invention of the first embodiment. As is clear from FIG. 17B, the image 310 is displayed being scaled down so as to be fit in the page size of the image 300. Such a scaled down display of the input image 310 is not optimum display for a user.

According to the first embodiment, in converting a plurality of document images each having a different page size into an electronic document, each of the document images are divided into groups based on the page size, and an electronic document is generated for each of the groups. Thus, a user can obtain electronic documents with the page size of each document image being maintained. Furthermore, since the electronic document has sequence information of the document image, the displaying/editing program 121 can display the electronic document according to the sequence information. Thus, a user can display/print the electronic documents according to the sequence without considering the groups, and thereby, can easily carry out an editing work etc. of the electronic documents.

Second Embodiment

Figure 6:
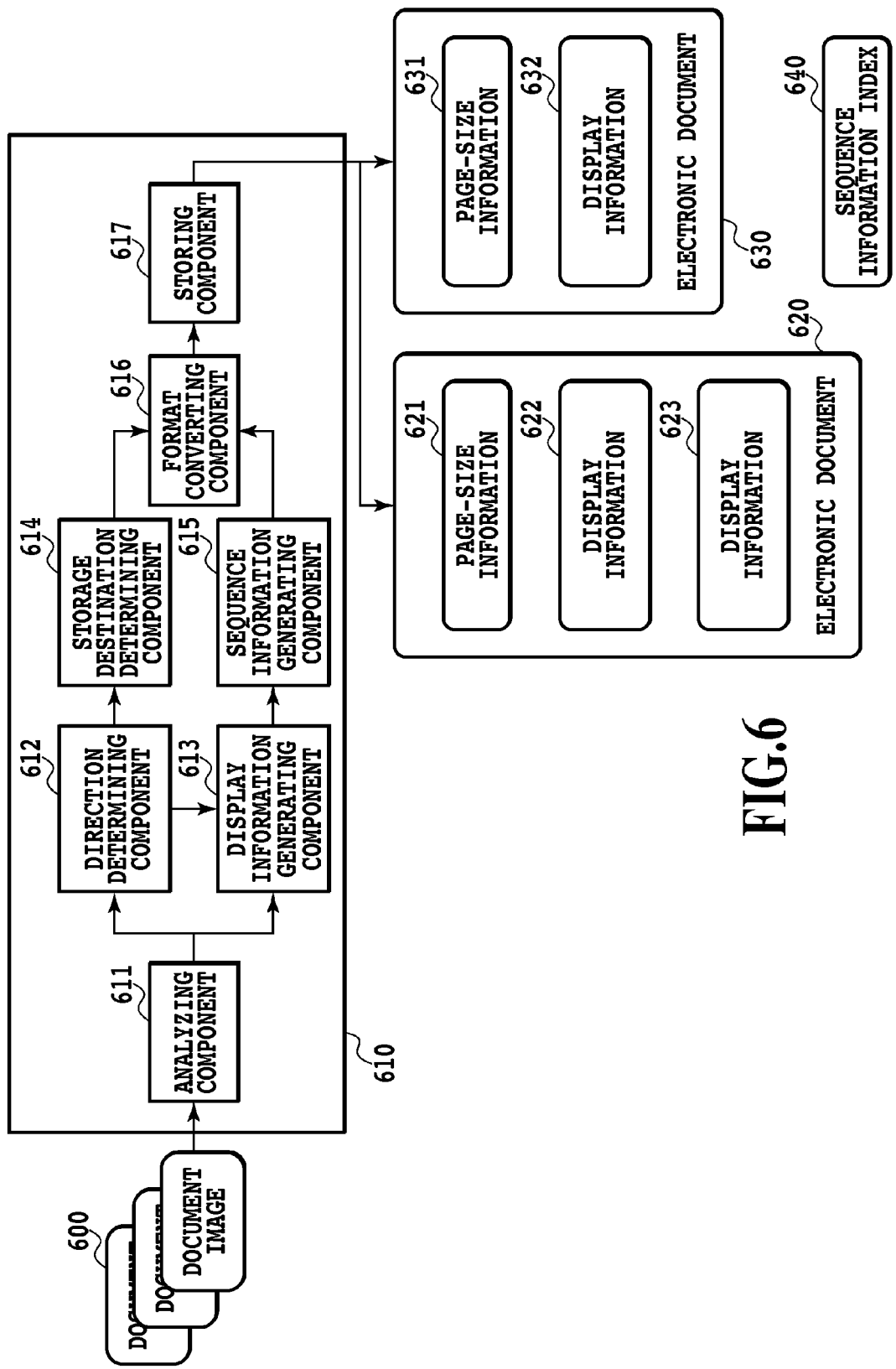
FIG. 6 is a block diagram illustrating another exemplary configuration of an image processing device that executes electronic document generation processing.

FIG. 6 is a block diagram illustrating an exemplary configuration of an image processing device 110 that executes electronic document generation processing according to a second embodiment.

Reference numerals 600 are a plurality of document images to be input sequentially from a scanner 101.

Reference numeral 610 is an electronic document generating component that converts the input plurality of document images 600 into electronic documents.

Reference numerals 620 and 630 are electronic documents each generated by the same method and having the same page size information. That is, each of the electronic documents 620 and 630 has a format in which a plurality of page sizes cannot be mixed.

Reference numeral 640 is a sequence information index. Details thereof will be described later.

Hereinafter, an exemplary configuration of the electronic document generating component 610 will be described in detail.

Reference numeral 611 is an analyzing component that analyzes the input plurality of document images 600 so as to extract the dimension and regions (a text region, a graphic region, a background region or the like) of each of the document images.

Reference numeral 612 is a direction determining component that recognizes characters included in the text region extracted by the analyzing component 611, and, based on the character direction of each of the recognized character, determines the manuscript direction of each of the document images 600 (among directions of 0°, 90°, 270° and the like).

Reference numeral 613 is a display information generating component that converts the contour information of each of the characters included in the text region extracted by the analyzing component 611, and, based on the manuscript direction of each of the document images 600 received from the direction determining component 612, corrects the manuscript direction and generates display information.

Reference numeral 614 is a storage destination determining component that, based on a dimension of each of the document images 600 analyzed by the analyzing component 611 and the manuscript direction of each of them determined by the direction determining component 612, determines a storage destination of the display information generated by the display information generating component 613. The storage destination is the electronic document 620 or the electronic document 630. That is, the storage destination determining component 614 determines storage destinations so that document images 600 each having the same page size information are stored on the same storage destination. In other words, the storage destination determining component 614 determines storage destinations so that document images 600 each having different page size information are stored on different storage destinations.

Reference numeral 615 is a sequence information generating component that, based on the sequence by which each of the document images is input, generates sequence information corresponding to the display information.

Reference numeral 616 is a format converting component that converts the display information received from the sequence information generating component 615 into the format of the electronic document 620 or 630. Further, the format converting component 616 converts the sequence information received from the sequence information generating component 615 into the format of a sequence information index 640.

Reference numeral 617 is a storing component that stores the display information and the sequence information index, of which formats are converted by the format converting component 616, on a storage destination determined by the storage destination determining component 614.

The electronic document 620 is constructed by one piece of page-size information 621 and pages-number (in this figure; two) pieces of display information 622 and 623. Similarly, the electronic document 630 is constructed by one piece of page-size information 631 and pages-number (in this figure; one) pieces of display information 632. The electronic documents 620 and 630 are transmitted to the PC 120 via the LAN 110, displayed/edited by the displaying/editing program 121 installed on the PC 120, and displayed and printed according to the sequence indicated by the sequence information index 640.

The page-size information 621 indicates a page size specific to the electronic document 620, and the page-size information 631 indicates a page size specific to the electronic document 630. The page size is constructed by the dimension and the manuscript direction of the document image 600.

While the pieces of display information 622 and 623 indicate the display information of the electronic document 620, the piece of display information 632 indicates the display information of the electronic document 630. These pieces of display information are used by the displaying/editing program. The sequence information index 640 indicates the order of display or print. The sequence information index 640 may be included in the electronic documents 620 and 630 or may be present separately from the electronic documents 620 and 630.

FIG. 10 is a view illustrating an example of a plurality of document images 600 to be input into the electronic document generating component 610.

The document image 600 is composed of seven images 1001 to 1007. The manuscript direction of the input images 1001, 1003, 1004 and 1007 is longitudinal, and the manuscript direction of the input images 1002, 1005 and 1006 is transversal.

When images 1001 to 1007 are input into the electronic document generating component 610 in this order, processing with respect to these images executed by the component 610 will be described below.

The analyzing component 611, using the same approach as that of the first embodiment, extracts text regions from each of the images.

The direction determining component 612, using the same approach as that of the first embodiment, detects the character direction in each of the text regions to determine the manuscript direction. In case of the input image illustrated in FIG. 10, the manuscript direction of the images 1001, 1003, 1004 and 1007 is determined to be 0°, and the manuscript direction of the images 1002, 1005 and 1006 is determined to be 270°.

FIG. 11 is a view illustrating a state in which, the images 1002, 1005 and 1006 each of which manuscript direction is determined to be 270° are rotated so that their manuscript direction becomes to be 0°, are arranged in parallel with each other.

The display information generating component 613, using the same approach as that of the first embodiment, generates display information for each of the images.

The storage destination determining component 614, using the same approach as that of the first embodiment, determines a storage destination for each display information.

The sequence information generating component 615, based on the input order of the images 1001 to 1007, generates sequence information. FIG. 13 is a view illustrating the sequence information index 640 generated based on the sequence information.

The format converting component 616, according to the storage destination determined by the storage destination determining component 614 and the sequence information generated by the sequence information generating component 615, converts the display information into an electronic document format and generates electronic documents 620 and 630.

Figure 14:
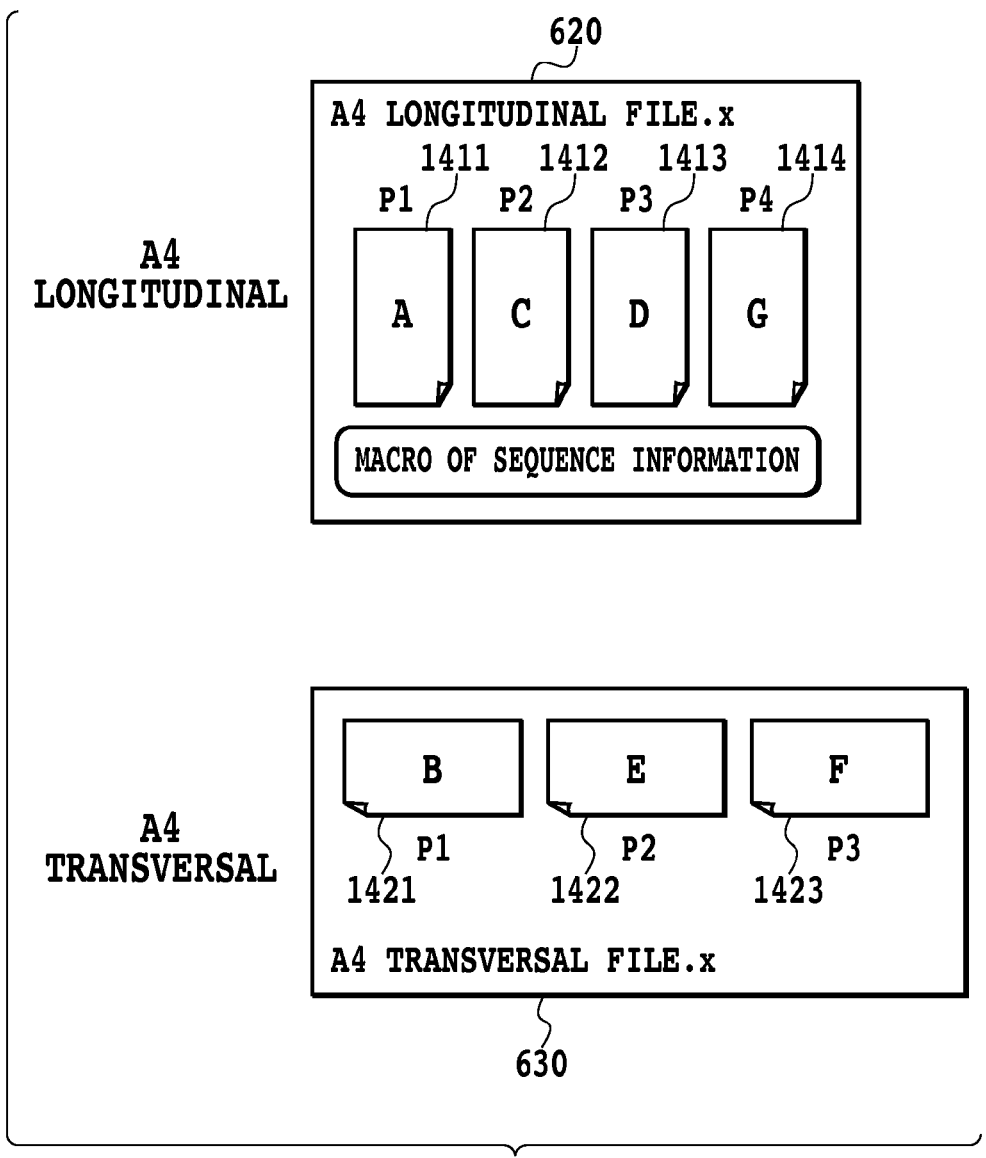
FIG. 14 is a view illustrating an exemplary configuration of an electronic document.

FIG. 14 is a view illustrating an exemplary configuration of each of the generated electronic documents.

Reference numeral 620 indicates an electronic document obtained by converting the format of the display information of the images 1101, 1103, 1104 and 1107 illustrated in FIG. 11 into an A4 longitudinal file, and reference numeral 630 indicates an electronic document obtained by converting the format of the display information of the images 1102, 1105 and 1106 illustrated into an A4 transversal file. Here, reference numerals 1411 to 1414 in FIG. 14 correspond to images 1110, 1103, 1104 and 1107 illustrated in FIG. 11, and reference numerals 1421 to 1423 in FIG. 14 correspond to images 1102, 1105 and 1106 in FIG. 11.

Although, in the exemplary configuration, the sequence information is stored on an A4 longitudinal file, it may be stored on another file.

Figure 12:
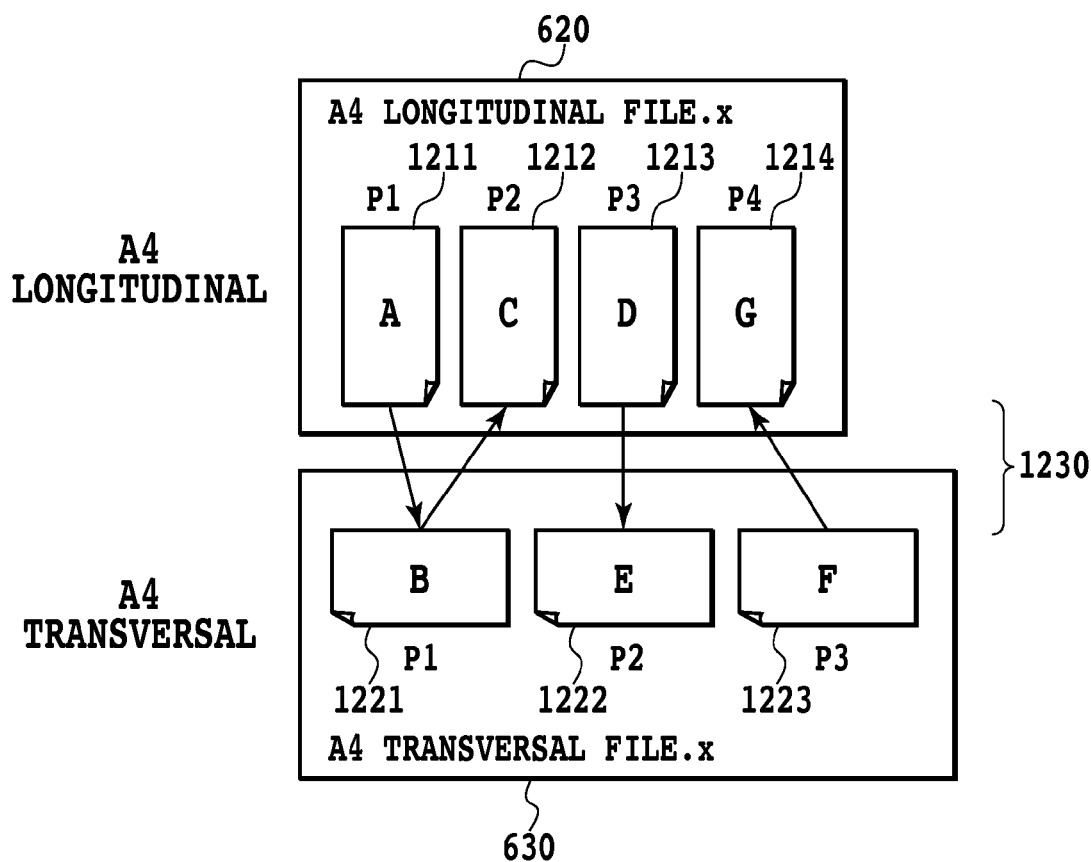
FIG. 12 is a view illustrating another exemplary construction of a list by a hyperlink.

In addition, as illustrated in FIG. 12, an electronic document may have a configuration in which sequential order of pieces of display information determined by a hyperlink in the same manner as in the first embodiment. In FIG. 12, arrows 1230 indicate the hyperlink.

FIGS. 15 and 16 are views illustrating example of the electronic documents 620 and 630 respectively, generated according to a virtual XML format for describing the second embodiment.

In the electronic document 620 illustrated in FIG. 15, the page-size information 621, pieces of display information 1502 to 1504, and sequence information 1505 are described. The displaying/editing program 121 displays/prints an electronic document according to the sequence information 1505. Each of the pieces of display information 1502 to 1504 is configured by vector drawing data. On the other hand, in the electronic document illustrated in FIG. 16, the page-size information 631 and pieces of display information 1602 to 1604 are described. Each of the pieces of display information 1602 to 1604 is configured by vector drawing data.

Processing by the displaying/editing program 121 installed on the PC 120 is the same as that of the first embodiment.

In the second embodiment, in converting a plurality of document images each having a different page size into electronic documents, the document images are divided into groups based on the page size thereof, and electronic documents each corresponding to each of the groups are generated. Accordingly, a user can obtain electronic documents in which the page size of each of the document images is maintained. Further, since the electronic documents have the sequence information of the document images, the displaying/editing program 121 can display the electronic documents according to the sequence information. Therefore, a user can display/print the electronic documents according to the sequence, and thereby can easily carry out an editing work etc. of the electronic documents.

Other Embodiments

The present invention can also be embodied in a case in which, a recording medium recording a computer program realizing the functions of the above-mentioned embodiments is attached to a system or a device, and a computer of the system etc. reads and executes a program code from the recording medium. The recording medium is computer-readable. In this case, the program code itself read out from the recording medium will realize the functions of the above-mentioned embodiments, and the recording medium storing the program code embodies the present invention. Moreover, a case in which, based on an instruction of a program code, an operating system (OS) or the like running on a computer executes a part or all of practical processing so as to achieve the functions of the embodiments, may also embody the present invention. Furthermore, a case in which after a program code read out from a recording medium is written on a function expansion card or board of a computer, the function expansion card etc., based on an instruction of the program code, executes a part or all of practical processing so as to achieve the functions of the embodiments, may also embody the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-147202, filed Jun. 4, 2008, which is hereby incorporated by reference herein in its entirety.

What is claimed is:

1. An image processing device, comprising:
an analyzing component configured to analyze page sizes and directions of a plurality of input images;
a display information generating component configured to generate plural pieces of display information corresponding to the plurality of input images;
a storage destination determining component configured to determine which of electronic documents is a storage destination for each of the pieces of display information so that pieces of the display information having the same page sizes are stored on the same electronic document, based on the page size and direction of each of the input images analyzed by the analyzing component, wherein each of the electronic documents has a format in which different size pages cannot be mixed;
a sequence information generating component configured to generate sequence information of the pieces of display information, based on an input order of the plurality of images; and
a storing component configured to store each piece of the display information and the sequence information to the electronic documents determined as the storage destination by the determining component.

2. The image processing device as recited in claim 1, wherein the storage destination determining component, based on each page size of the input images when they are corrected based on the direction, determines which of electronic documents is the storage destination for each of the pieces of display information so that pieces of the display information having the same page sizes are stored on the same electronic document.

3. The image processing device as recited in claim 1, wherein the analyzing component, based on a direction of a character included in each of the plurality of input images, determines a direction of each of input images.

4. The image processing device as recited in claim 1, wherein the sequence information indicates a sequence of the display information by a hyperlink.

5. The image processing device as recited in claim 1, wherein the sequence information indicates a sequence of the display information by an index.

6. The image processing device as recited in claim 1, wherein the storing component stores the display information and the sequence information by converting each of them into a format of each of electronic documents to be the storage destination.

7. A method of image processing, comprising the steps of:
analyzing page sizes and directions of a plurality of input images:
generating plural pieces of display information corresponding to the plurality of input images;
determining which of electronic documents is a storage destination for each of the pieces of display information so that pieces of the display information having the same page sizes are stored on the same electronic document, based on the page size and direction of each of the input images analyzed at the analyzing step, wherein each of the electronic documents has a format in which different size pages cannot be mixed;
generating sequence information of the pieces of display information based on an input order of the plurality of images; and
storing each piece of the display information and the sequence information to the electronic documents determined as the storage destination at the determining step.

8. A program stored on a non-transitory computer readable memory medium for causing a computer to function as:
- an analyzing component configured to analyze page sizes and directions of a plurality of input images;
- a display information generating component configured to generate plural pieces of display information corresponding to the plurality of input images;
- a storage destination determining component configured to determine which of electronic documents is a storage destination for each of the pieces of display information so that pieces of the display information having the same page sizes are stored on the same electronic document, based on the page size and direction of each of the input images analyzed by the analyzing component, wherein each of the electronic documents has a format in which different size pages cannot be mixed;
- a sequence information generating component configured to generate sequence information of each of the pieces of display information, based on an input order of the plurality of images; and
- a storing component configured to store each piece of the display information and the sequence information to the electronic documents determined as the storage destination by the determining component.

9. The computer program as recited in claim 8, wherein the storage destination determining component, based on each page size of the input images when they are corrected based on the direction, determines which of electronic documents is the storage destination for each of the pieces of display information so that the pieces of the display information having the same page sizes are stored on the same electronic document.

10. The computer program as recited in claim 8, wherein the analyzing component, based on a direction of a character included in each of the plurality of input images, determines a direction of each of the input images.

11. The computer program as recited in claim 8, wherein the sequence information indicates a sequence of the display information by a hyperlink.

12. The computer program as recited in claim 8, wherein the sequence information indicates a sequence of the display information by an index.

13. The computer program as recited in claim 8, wherein the storing component stores the display information and the sequence information by converting each of them into a format of each of electronic documents to be the storage destination.

\* \* \* \* \*